(12) United States Patent  (10) Patent No.: US 8,505,249 B2
Geary  (45) Date of Patent: Aug. 13, 2013

(54) HOOK AND LOOP ATTACHMENT OF SOLAR PANELS TO ROOFING MEMBRANES

(75) Inventor: John Geary, Carmel, IN (US)

(73) Assignee: Firestone Building Products Co., LLC, Indianapolis, IN (US)

( * ) Notice: Subject to any disclaimer, the term of this patent is extended or adjusted under 35 U.S.C. 154(b) by 290 days.

(21) Appl. No.: 12/515,822

(22) PCT Filed: Nov. 21, 2007

(86) PCT No.: PCT/US2007/024328
§ 371 (c)(1),
(2), (4) Date: May 21, 2009

(87) PCT Pub. No.: WO2008/063660
PCT Pub. Date: May 29, 2008

(65) Prior Publication Data
US 2010/0059104 A1   Mar. 11, 2010

Related U.S. Application Data

(60) Provisional application No. 60/860,561, filed on Nov. 21, 2006.

(51) Int. Cl.
*E04D 13/18* (2006.01)

(52) U.S. Cl.
USPC .................. 52/173.3; 52/DIG. 13; 126/622; 126/623; 136/244

(58) Field of Classification Search
USPC ............... 52/DIG. 13, 173.3; 126/621–623; 136/244; 165/48.2
See application file for complete search history.

(56) References Cited

U.S. PATENT DOCUMENTS

| | | | | |
|---|---|---|---|---|
| 3,077,703 | A * | 2/1963 | Bergstrom | 52/396.04 |
| 3,288,136 | A | 11/1966 | Lund | |
| 3,370,818 | A | 2/1968 | Perr | |
| 3,403,429 | A | 10/1968 | Smith | |
| 3,992,121 | A * | 11/1976 | Geiger | 404/47 |
| 4,101,101 | A * | 7/1978 | Barkats et al. | 244/172.7 |
| 4,616,456 | A * | 10/1986 | Parker | 52/202 |
| 4,636,579 | A | 1/1987 | Hanak et al. | |

(Continued)

FOREIGN PATENT DOCUMENTS

| DE | 103 29 184 A1 | 1/2005 |
|---|---|---|
| EP | 0 990 746 A1 | 4/2000 |

(Continued)

OTHER PUBLICATIONS

"Presentation of publications and the like" English translation dated Mar. 2, 2011 from Japanese patent associate. Contents related to Japanese patent office forwarding third party submission of prior art documents in corresponding JP Appl. No. 2009-538412.

(Continued)

*Primary Examiner* — Robert Canfield
*Assistant Examiner* — Charissa Ahmad
(74) *Attorney, Agent, or Firm* — Jason A. Houser; Arthur M. Reginelli

(57) ABSTRACT

An energy generating system for placement on a roof structure is disclosed including one or more solar panels (10) being secured to roof system components. The solar panels are secured thereto with hook and loop fasteners (16, 78) that may be integral with the roof system components (86).

11 Claims, 9 Drawing Sheets

(56) References Cited

U.S. PATENT DOCUMENTS

| | | | |
|---|---|---|---|
| 4,674,244 A * | 6/1987 | Francovitch | 52/173.3 |
| 4,677,248 A * | 6/1987 | Lacey | 136/244 |
| 4,886,554 A | 12/1989 | Woodring et al. | |
| 4,974,384 A * | 12/1990 | Pacione | 52/483.1 |
| 4,977,730 A * | 12/1990 | Pardo | 52/602 |
| 5,316,592 A * | 5/1994 | Dinwoodie | 136/244 |
| 5,377,468 A * | 1/1995 | Repasky | 52/302.4 |
| 5,505,788 A | 4/1996 | Dinwoodie | |
| 5,522,943 A | 6/1996 | Spencer et al. | |
| 5,590,495 A * | 1/1997 | Bressler et al. | 52/173.3 |
| 5,746,839 A * | 5/1998 | Dinwoodie | 136/251 |
| 5,928,437 A * | 7/1999 | Dillard | 136/244 |
| 5,990,414 A | 11/1999 | Posnansky | |
| 6,032,291 A | 3/2000 | Asenguah et al. | |
| 6,061,978 A | 5/2000 | Dinwoodie et al. | |
| 6,337,436 B1 | 1/2002 | Ganz | |
| 6,410,843 B1 * | 6/2002 | Kishi et al. | 136/246 |
| 6,453,629 B1 * | 9/2002 | Nakazima et al. | 52/173.3 |
| 6,501,013 B1 * | 12/2002 | Dinwoodie | 136/251 |
| 6,570,084 B2 * | 5/2003 | Dinwoodie | 136/251 |
| 6,662,572 B1 * | 12/2003 | Howard | 62/3.61 |
| 6,883,290 B2 * | 4/2005 | Dinwoodie | 52/748.1 |
| 6,956,500 B1 * | 10/2005 | Ducharme et al. | 340/870.02 |
| 6,959,993 B2 | 11/2005 | Gross et al. | |
| RE38,988 E | 2/2006 | Dinwoodie | |
| 7,185,473 B2 * | 3/2007 | Pacione | 52/747.11 |
| 7,219,476 B2 * | 5/2007 | Akins et al. | 52/551 |
| 7,328,534 B2 * | 2/2008 | Dinwoodie | 52/173.3 |
| 7,406,800 B2 * | 8/2008 | Cinnamon et al. | 52/173.3 |
| 7,587,864 B2 * | 9/2009 | McCaskill et al. | 52/173.3 |
| 2001/0054262 A1 * | 12/2001 | Nath et al. | 52/173.3 |
| 2007/0220823 A1 * | 9/2007 | Akins et al. | 52/409 |
| 2007/0266660 A1 * | 11/2007 | Davies et al. | 52/309.1 |
| 2007/0272320 A1 * | 11/2007 | Roberson | 138/149 |
| 2007/0295390 A1 * | 12/2007 | Sheats et al. | 136/251 |
| 2008/0099062 A1 * | 5/2008 | Armstrong et al. | 136/248 |
| 2008/0245404 A1 * | 10/2008 | DeLiddo | 136/251 |
| 2009/0266400 A1 * | 10/2009 | DeLiddo et al. | 136/244 |

FOREIGN PATENT DOCUMENTS

| | | |
|---|---|---|
| FR | 2 813 927 A1 | 3/2002 |
| GB | 2 438 526 A | 11/2007 |
| JP | 07-22640 A | 1/1995 |
| JP | 09-209575 A | 8/1997 |
| JP | 10-231600 A | 9/1998 |
| JP | 2004 036098 A | 2/2004 |
| WO | WO 98/36139 A1 | 8/1998 |
| WO | WO 2008 063660 A3 | 5/2008 |

OTHER PUBLICATIONS

The international preliminary report on patentability, International Appl. No. PCT/US2007/024328; dated in European Registry Jun. 10, 2009; 7 pages.

International Search Report, International Appl. No. PCT/US2007/024328; dated in European Registry Jul. 3, 2008; 3 pages.

* cited by examiner

US 8,505,249 B2

HOOK AND LOOP ATTACHMENT OF SOLAR PANELS TO ROOFING MEMBRANES

This Application claims the benefit of U.S. Provisional Application No. 60/860,561, filed Nov. 21, 2006, which is incorporated herein by reference.

FIELD OF THE INVENTION

One or more embodiments of the present invention relate to a roofing system including hook and loop fasteners to secure photovoltaic devices to a building rooftop.

BACKGROUND OF THE INVENTION

Photovoltaic devices, sometimes referred to as solar cells, can be added to the rooftop of building structures. Solar cells convert light energy from the sun into electricity that may be used or stored for later use. Many industrial buildings have large, elevated, flat-topped roofs that may be desirable for solar cell placement.

Installation of photovoltaic systems has typically involved coupling the devices to a roof with mechanical fasteners such as bolts or screws. While this is an effective means to secure the devices, the roof can be permanently damaged or altered by the required mechanical fastener or drilling during installation. These holes may leak and may be the source of other eventual failures such as tearing or cracking. Further, the use of mechanical fasteners, like screws or bolts, can be time consuming and require precise measurement and drilling of fastener holes. Also, mechanical fasteners are relatively permanent, and the photovoltaic devices may not be easily moved or removed without leaving damaged roof sections.

Other means of attaching solar cells to a roof surface have been proposed. For example chemical adhesives or hook and loop fasteners can be employed. Hook and loop fasteners have been used to secure solar panels on a roof deck by applying the hook and loop fastener directly to a roof membrane. While this approach may not necessarily compromise the integrity of the roof membrane, it is still time consuming to install, not adequately integrated into the roof system, and requires multiple steps during roof installation. Thus they may be expensive to install and susceptible to failure.

Thus, there exists a need in the art for means to secure photovoltaic devices to rooftops that does not compromise the water resistant properties thereof and that are integrated into the roofing system.

SUMMARY OF THE INVENTION

One or more embodiments of the present invention provides an energy generating system for placement on a roof structure comprising at least one paver positioned on top of the roof structure, a paver fastener secured to said paver, a solar panel including a top surface adapted to receive light and a bottom surface having a panel fastener secured thereto, wherein said paver and said panel fasteners are alternately of a hook or loop structure and are positioned adjacent to each other to couple said solar panel to said paver.

One or more embodiments of the present invention also provides an energy generating system for placement on a roof structure comprising a pad having a bottom surface and a top surface, said top surface having a pad fastener secured thereto, said bottom surface being adhered to said roof membrane, a solar panel including a top surface adapted to receive light and a bottom surface having a panel fastener secured thereto, wherein said pad and said panel fastener are alternately of a hook or loop structure and are positioned adjacent to each other to couple said solar panel to said pad.

DETAILED DESCRIPTION OF THE ILLUSTRATIVE EMBODIMENTS

The following figures illustrate a number of roofing systems and corresponding hook and loop fastening arrangements. The photovoltaic devices (hereinafter "Solar Panels") of the present invention include a plurality of photovoltaic cells that are electrically connected and encapsulated as a module. Practice of this invention is not necessarily limited by the type of cell or design of the panel. As is known in the art, the photovoltaic cells may be semi-conductor wafers. Solar panels may include semi-conductor wafers positioned between a glass or clear plastic panel on the outwardly facing surface (sun exposed surface), and a resin barrier on the opposed surface (facing the roof surface). This arrangement allows light to be transmitted to the cells while protecting them from rain, hail or other environmental dangers. Solar panels may also be connected in series to create an additive voltage. For simplicity, the plurality of wires and cables that interconnect the solar panels will not be shown in the accompanying figures.

Figure 1:
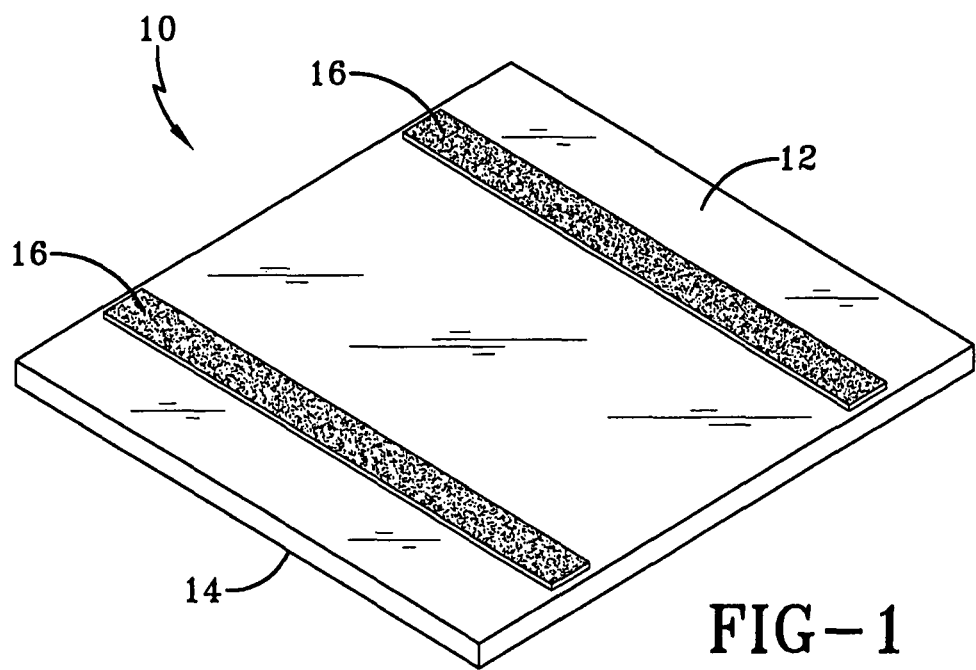
FIG. 1 is an isometric view of a solar panel made according to the methods of the present invention.
Figure 2:
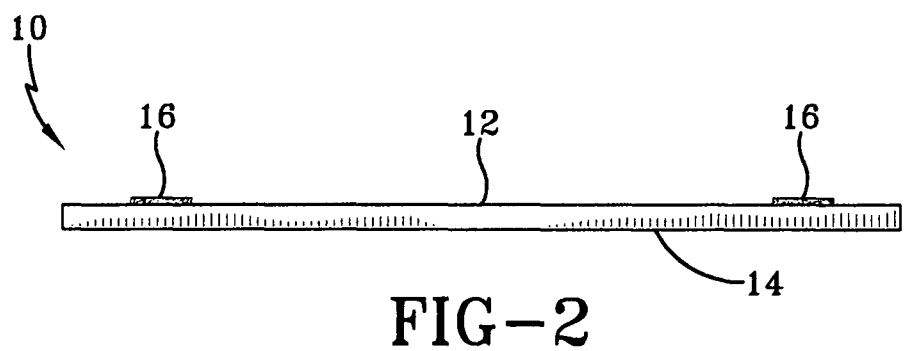
FIG. 2 is a side view of the solar panel of FIG. 1.

Referring now to FIGS. 1 and 2, a modified solar panel 10 is shown. Modified solar panel 10 includes a bottom surface 12 and a top surface 14. Top surface 14 is adapted to receive light and transmit light to the photovoltaic cells therein. Bottom surface 12 is adapted to face a roof surface and includes a panel fastener 16, of a hook and loop type fastener. Though the present embodiment shows a solar panel of a generally square shape, other shapes may be used. In the present embodiment, panel fastener 16 is secured directly to the solar panel 10. However, it should be appreciated that solar panel 10 may include a support frame or the like, to which panel fastener 16 may be secured.

Panel fastener 16 may be a hook-type material in the form of a substrate (e.g., thin sheet) having a plurality of hooks projecting therefrom. Panel fastener 16 may conversely be a loop-type material and be in the form of a substrate (e.g., thin sheet) having a plurality of loops projecting therefrom. As is known in the art, when the hook-type material contacts the loop-type material, a releasable mechanical connection is formed. Exemplary hook and loop fasteners may be found in U.S. Pat. Nos. 3,288,136, 3,370,818 and 3,403,429 which are hereby incorporated by reference. For the purposes of clarity, the term fastener will be used throughout this disclosure and it should be appreciated that either hook-type or loop-type fasteners may be used in reference thereto so long as the opposed, mating fastener is of the opposite type.

Panel fastener 16 may be secured to the bottom surface 12 of solar panel 10 with adhesives or the like. Any arrangement may be used. For example, as shown in FIGS. 1 and 2, panel fastener 16 may be in the form of a pair of spaced strips. In other embodiments, three or more spaced strips might be employed. In still other embodiments, panel fastener 16 may be disposed on bottom surface 12 in a grid-like or crossed pattern. In still other embodiments, panel fastener 16 may cover substantially the entire bottom surface 12. In this manner, solar panel 10 includes a top surface 14 that receives light for conversion to electricity and a bottom surface 12 that includes a panel fastener 16.

Figure 3:
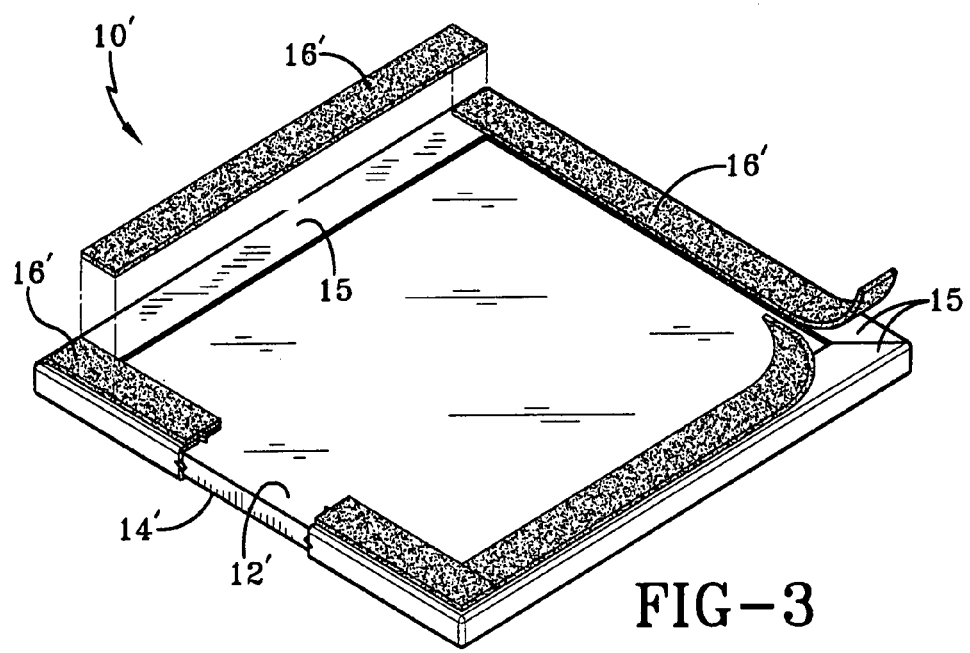
FIG. 3 is an isometric view of an alternate solar panel made according to the methods of the present invention.
Figure 4:
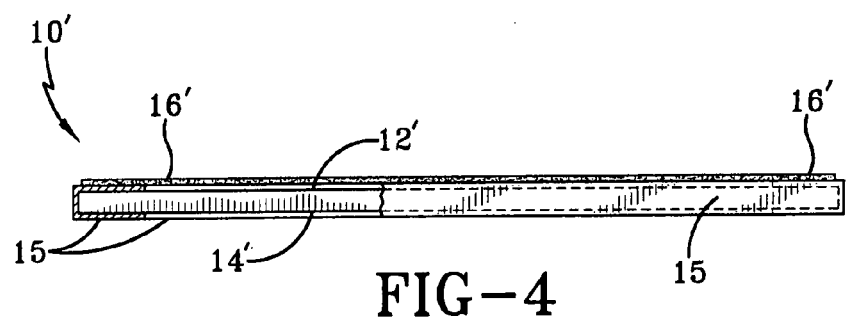
FIG. 4 is a side view of the alternate solar panel of FIG. 3.

Referring now to FIGS. 3 and 4, an alternative embodiment of modified solar panel 10' is shown. Modified solar panel 10' includes a bottom surface 12' and a top surface 14'. Top surface 14' is adapted to receive light and transmit light to the photovoltaic cells therein. Bottom surface 12' is adapted to face a roof surface. A frame 15 is provided around the peripheral edge of panel 10. Frame 15 may provide added strength and protection for panel 10'. One or more panel fasteners 16', of a hook and loop type fastener, may be secured to the bottom surface of frame 15. In the present embodiment, all four legs of frame 15 include a panel fastener 16' thereon. In other embodiments, panel fasteners 16' may be provided on fewer legs. For instance, panel fasteners 16' may be provided on only a pair of opposed legs. Though the present embodiment shows a solar panel of a generally square shape, other shapes may be used. For example, panel 10' may be rectangular, triangular or any other shape. Throughout the foregoing disclosure, reference will be made to panel 10, but it should be appreciated that panel 10' may be an equivalent substitution thereof.

Figure 5:
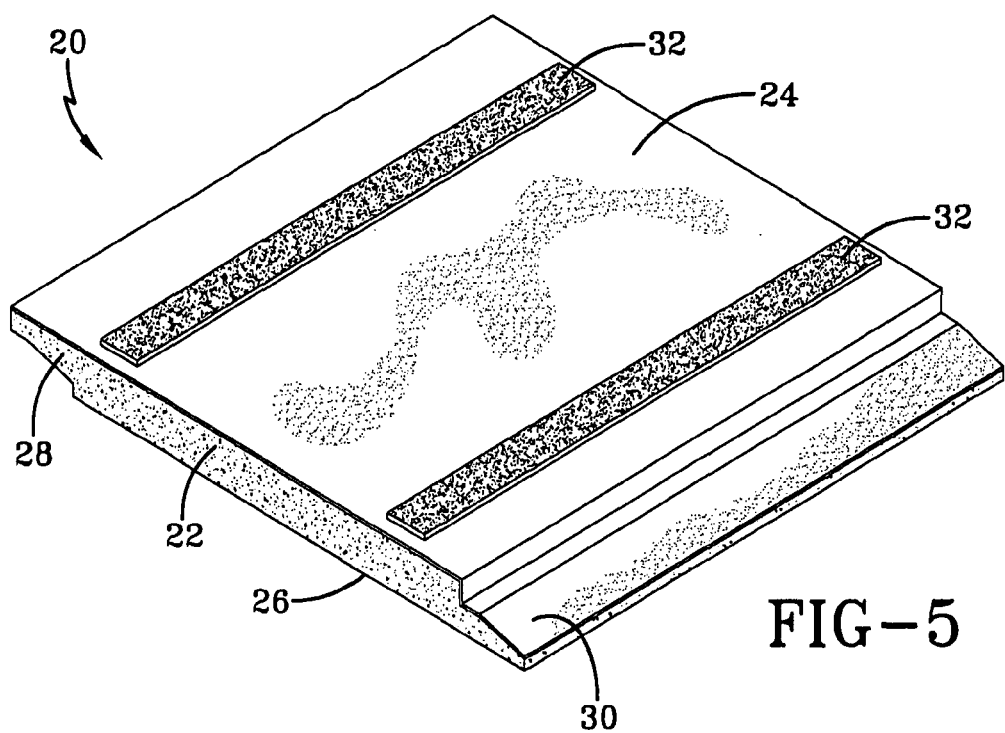
FIG. 5 is an isometric view of a paver according to the present invention.
Figure 6:
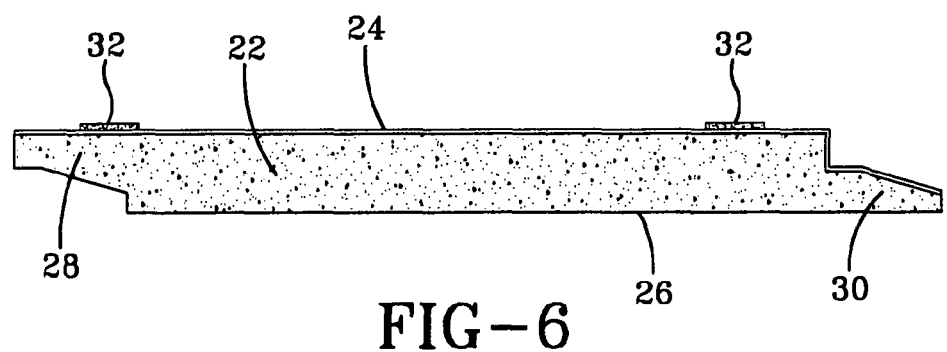
FIG. 6 is a side view of the paver of FIG. 3.

Referring now to FIGS. 5 and 6, an exemplary ballast paver made in accordance with the present invention is generally indicated by the numeral 20. A plurality of ballast pavers may be used in conjunction with a membrane roofing system, primarily to prevent membrane uplift during high wind conditions and help maintain the integrity of seams formed when two or more adjacent membrane sheets abut one another. Further, pavers 20 protect the underlying membrane from puncture and other damage. Pavers 20 may be composed of concrete, cement or the like. Paver 20 may be generally described as a low-profile rectangular block having a body 22 that includes a top surface 24 and an opposed bottom surface 26. An upper tongue 28 may be provided, projecting from one side of body 22. A lower tongue 30 may be provided projecting from an opposed side of body 22. Upper tongue 28 and lower tongue 30 may be adapted to overlie one another when pavers 20 are placed in an abutting relationship. This overlying, or interlocking, configuration helps prevent paver lift-off in high wind conditions. It should, however, be appreciated that various paver configurations may be used. For example, pavers 20 may be any shape and may or may not include overlaying features.

A paver fastener 32 may be provided on top surface 24 of paver 20 and may be secured thereto with adhesives or the like. Paver fastener 32 may be a hook-type material in the form of a thin sheet having a plurality of hooks projecting therefrom. Paver fastener 32 may conversely be a loop-type material and be in the form of a thin sheet having a plurality of loops projecting therefrom. As above, either hook-type or loop-type fasteners may be used so long as the opposed, mating fastener is of the opposite type. Thus, if panel fastener 16 is a loop-type fastener, the mating paver fastener 32 is a hook-type fastener, and vise versa.

Paver fastener 32 may be positioned on paver 20 in a variety of arrangements. For example, as shown in the present embodiment, paver fastener 32 may be in the form of a pair of spaced parallel strips. In other embodiments three or more spaced strips might be employed. In still other embodiments, paver fastener 32 may be disposed on top surface 24 in a grid-like or crossed pattern. In still other embodiments, paver fastener 32 may cover substantially the entire top surface 24.

Figure 7:
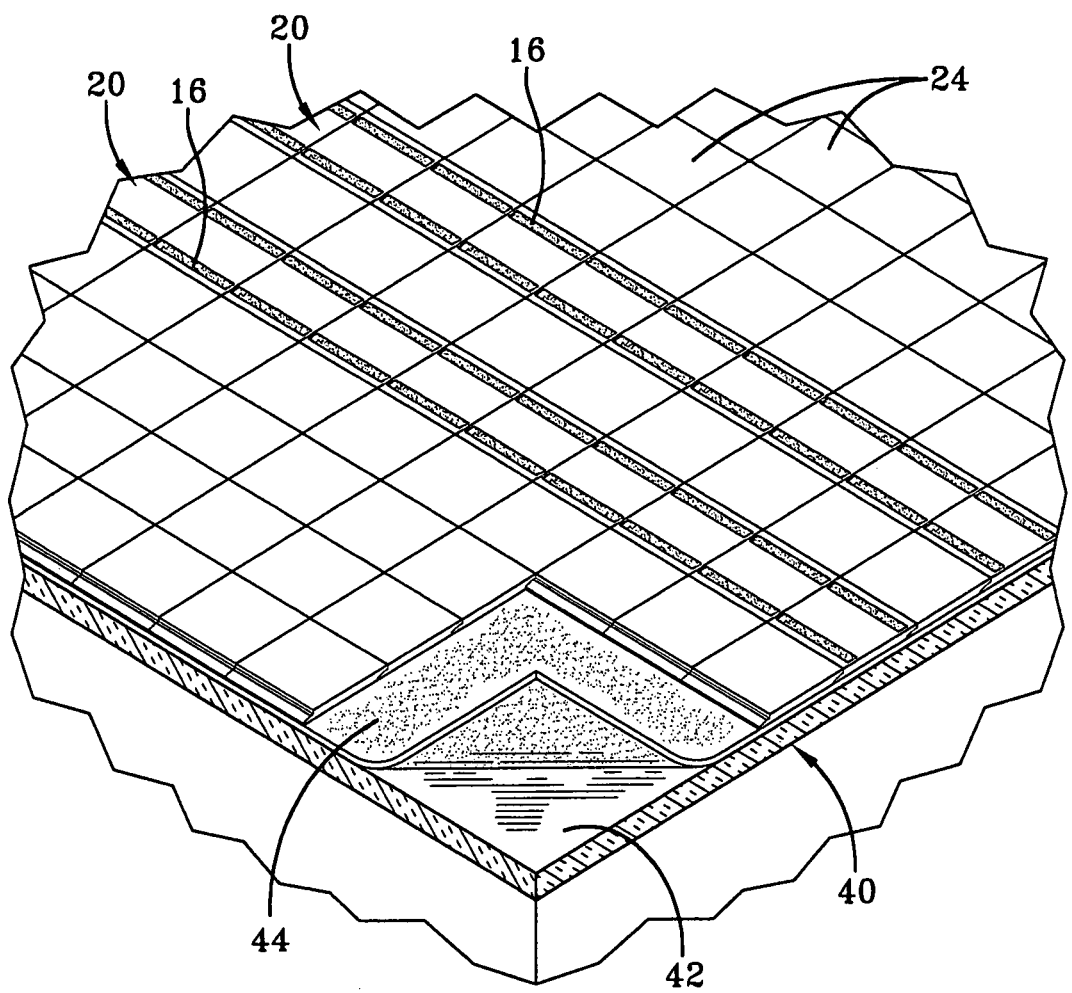
FIG. 7 is an elevated isometric view of a roof system according to the present invention.

Referring now to FIG. 7, pavers 20 are shown as used in conjunction with a roofing system 40. Roofing system 40 may include a roof structure 42 that is covered by a membrane 44, though it should be appreciated that pavers 20 may be used in conjunction with asphalt based or other built-up roof systems. In certain embodiments, insulation boards (not shown) may be provided between roof structure 42 and membrane 44 to prevent thermal transmission. Membrane 44 may be in the form of sheets and may consist of, for example, bitumus materials, EPDM, TPO or the like. The sheets may be seamed to one another, and may include other structural features necessary for attaching the membrane 44 to the roof structure 42. Pavers 20 may be positioned on top of membrane 44 in an abutting, and generally grid-like arrangement. Pavers 20 may be disposed over substantially the entire surface of membrane 44. Further, upper tongue 28 may overlap lower tongue 30 to interlock abutting pavers 20.

It should be appreciated that paver fasteners 32 need not be provided on all pavers 20, as not all of the roof surface will necessarily be provided with solar panels 10. For example, the embodiment shown in FIG. 7 includes a pair of contiguous rows of pavers 20 including paver fasteners 32. These contiguous rows of pavers 20 form generally uninterrupted lines of exposed paver fasteners 32. It should be appreciated that other arrangements may be employed. In one or more embodiments, three or more rows of pavers 20 having paver fasteners 32 may be provided. In other embodiments, pavers 20 having paver fasteners 32 may form a square or grid pattern. In still other embodiments, pavers 20 having paver fasteners 32 may completely cover an entire roof area. In any event, paver fasteners 32 are disposed on the upper surface of the roof and are thereafter capable of receiving a solar panel 10 thereon.

Figure 8:
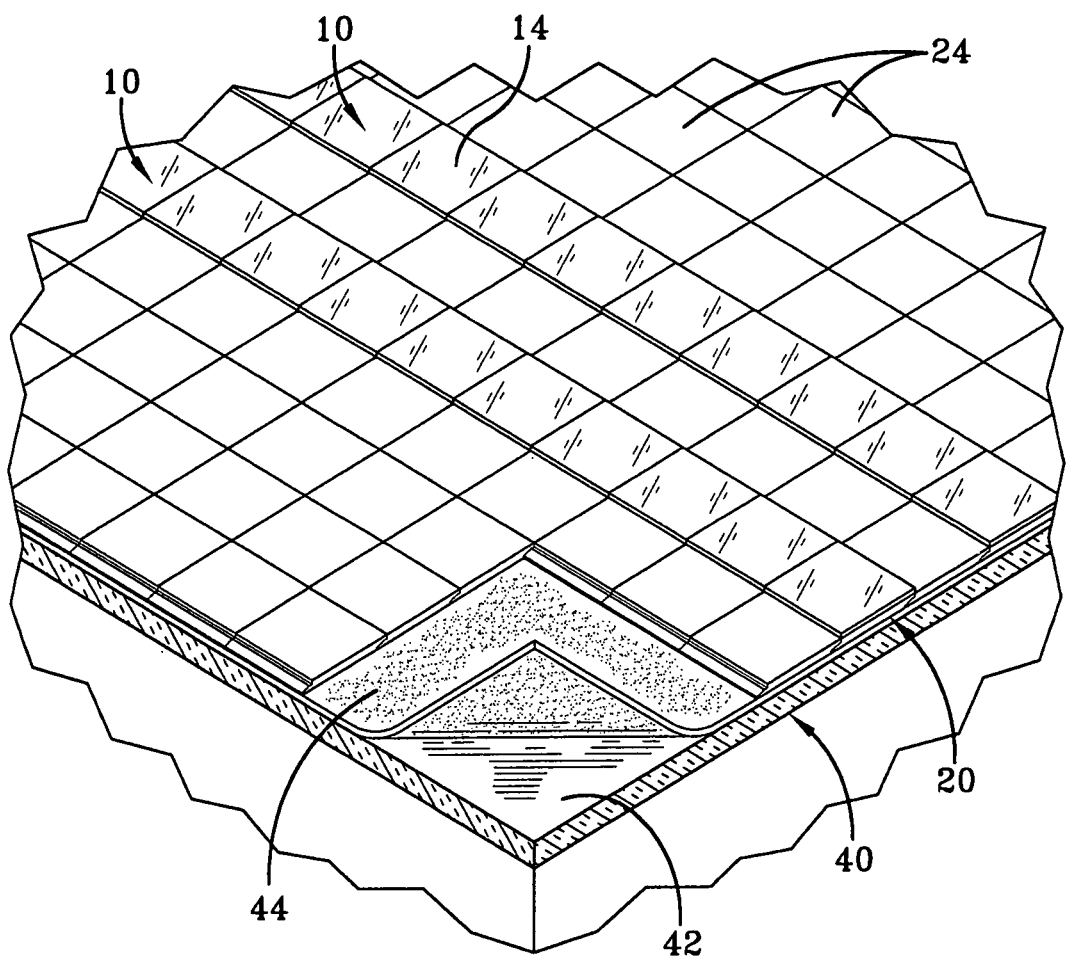
FIG. 8 is an elevated isometric view of a roof system with solar panels installed.

Referring now to FIG. 8, solar panels 10 are secured to pavers 20 by bringing together the panel fasteners 16 of solar panels 10 with paver fasteners 32 of pavers 20. Thereafter, solar panels 10 are mechanically, yet detachably, coupled to pavers 20 and consequently roof system 40. The mechanical coupling is capable of holding the solar panels against wind and other external forces, but is weak enough to allow the removal of solar panels 10 by a technician if replacement or movement is required. As is evident, solar panels 10 may be disposed in a contiguous row. In other embodiments, solar panels 10 may be disposed in a square or grid pattern on the roof surface. In still other embodiments, solar panels 10 may completely cover a portion of, or substantially all of, a roof surface. Solar panels 10 may be interconnected with a plurality of cables (not shown). The cables may or may not be releasable connections. The cables may extend to a junction box or other receiving station where the electric current may be conditioned and made available for use or stored in a battery system.

Figure 9:
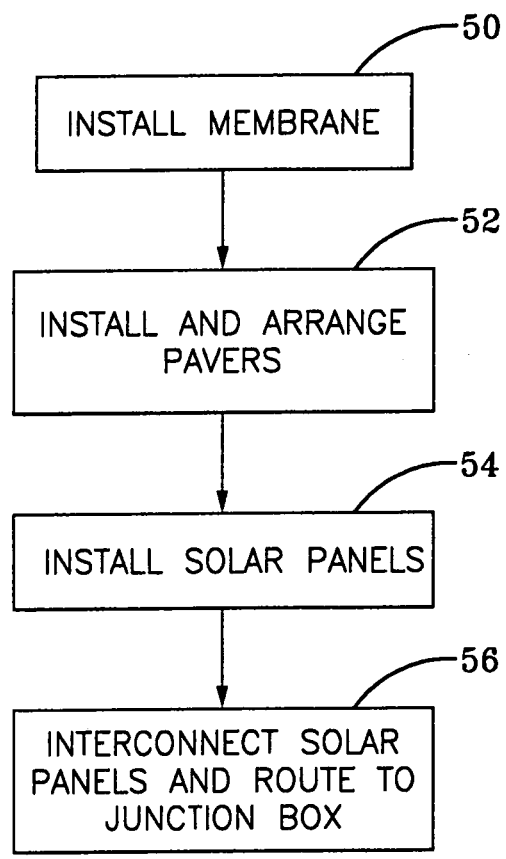
FIG. 9 is a flow chart exemplifying a method if installing solar panels according to the present invention.

Referring now to FIG. 9 an exemplary method of installation of the above disclosed paver/solar panel arrangement is shown. In a first step 50, membrane 44 is installed on roof structure 42. As discussed above, an optional insulation layer may be provided between roof structure 42 and membrane 44. Membrane 44 may be secured to roof structure 42 using mechanical fasteners, adhesives or any other known method. In one or more embodiments, no adhesive is provided between roof structure 42 and membrane 44, with the membrane being held down by the weight of pavers 20.

In a second step 52, pavers 20 are moved to the roof surface and arranged thereon. As disclosed above, some pavers 20 may not include paver fasteners 32 if not being installed in areas where solar panels 10 will be used. Pavers 20 may be arranged so that upper tongue 28 overlaps lower tongue 30 when in abutting relationship. Further, pavers including paver fasteners 32 may be arranged in abutting and contiguous relationship to form substantially contiguous rows or patterns of paver fasteners 32.

In one or more embodiments, paver fastener 32 is preinstalled onto paver 20 prior to transfer to a roof. In this or other embodiments, paver fastener 32 may be secured to paver 20 during the manufacturing process. By attaching paver fastener 32 to paver 20 during the manufacturing process, time may be saved during the installation. Further, the relatively clean environment of the factory may allow a more permanent attachment, particularly if using adhesives.

In other embodiments, paver fastener 32 may be attached to pavers 20 in a secondary step after manufacture of the paver. In these or other embodiments, paver fastener may be attached at the job site prior to transferring paver 20 to the roof. In other embodiments, paver fastener 32 may be secured to paver 20 after paver 20 is installed and arranged on the roof surface.

In a third step 54, solar panels 10 are positioned on top of pavers 20. Installation is accomplished by bringing together panel fasteners 16 of solar panels 10 with paver fasteners 32 of pavers 20. In this manner, solar panels 10 are secured to the roof top though the mechanical coupling of the hook and loop fasteners.

Finally, in a fourth step 56, solar panels 10 may be interconnected to a junction box or the like to receive electrical current and direct it to immediate use or send it to a battery mechanism for later use.

In this manner, solar panels 10 may be quickly and easily installed on a roof surface. By securing solar panels 10 to pavers 20, membrane 44 is not damaged, as permanent coupling means need not be applied directly to a roof membrane. Further, replacement or repair is made more simple because of the releasable nature of the hook and loop fasteners. Still further, time may be saved, particularly when paver fasteners 32 are secured to pavers 20 prior to placement on the roof surface.

Figure 10:
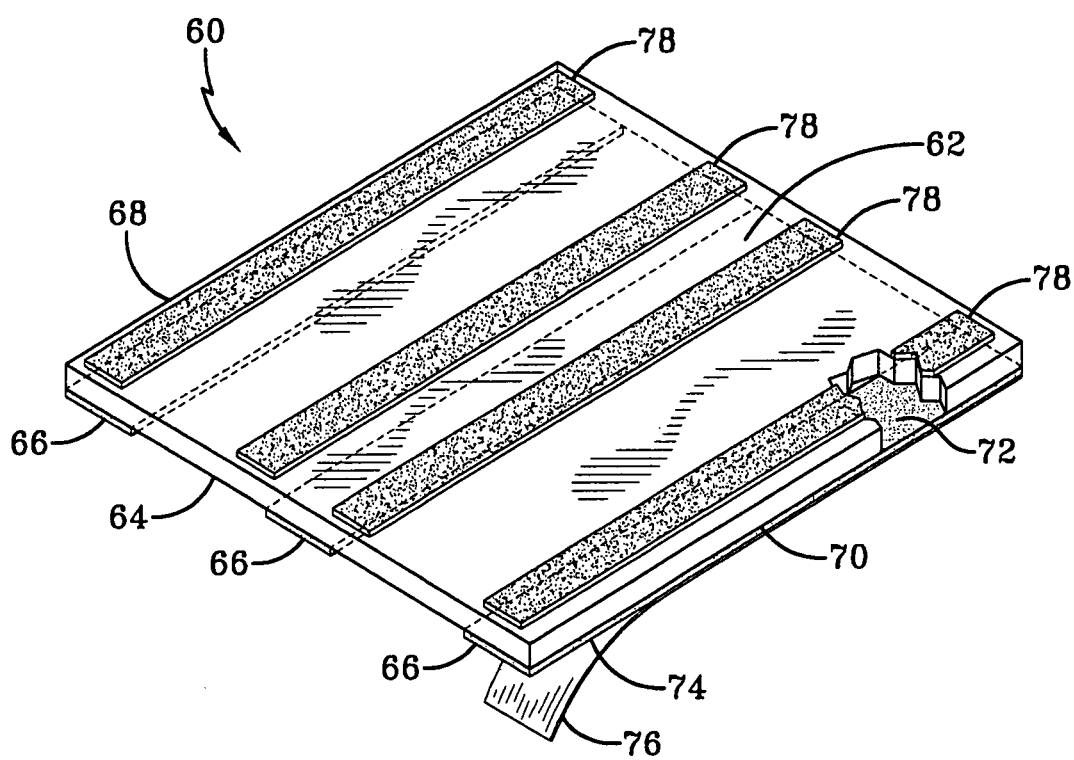
FIG. 10 is an isometric view of a pad according to the present invention.

Referring now to FIGS. 10-13, an alternative solar panel attachment arrangement is shown. As shown in FIG. 10, an exemplary roof pad made in accordance with the present invention is generally indicated by the numeral 60. Pads 60 may be sheet-like, generally flexible, and consist of polymeric and/or rubber materials. Pads 60 include upper and lower surfaces, 62 and 64 respectively. Lower surface 64 may be relatively smooth while upper surface 62 may include a texture to improve traction. An adhesive tape 66 may be applied in a series of strips such as at opposed edges 68 and 70, and at the center of pad 60, adhered directly to lower surface 64. The adhesive tape 66, provides upper and lower surfaces, 72 and 74 respectively, the upper surface 72 being applied to the lower surface 64 of the pad.

In one or more embodiments, application of tape 66 may be made at the factory, as part of the manufacturing operation. At this stage, pad 60 is relatively clean, so that separate cleaning and/or priming operations may not be required. Moreover, adhesion between tape 66 and pad 60 may be maximized due to the clean and controlled conditions for application as opposed to the field, i.e., upon a roof, where pads 60 may have become soiled or contaminated, thereby interfering with the adhesion of tape 66 to pad 60. A release paper 76 may be provided on lower side 74 of tape 66. The release paper 76 prevents exposure of surface 74 to dust and the like prior to installation on the roof. When in the field, (i.e. the rooftop), all that is required is for the installation personnel to strip away release paper 76, place the self-adhesive pad 60 onto the roof and then apply pressure which can be accomplished merely by walking over the pads or with the use of a roller.

In another embodiment, application of tape 66 may be made in the field. If done in the field, pad 60 may be cleaned and/or primed prior to application to ensure no soil or other contamination effects the quality of the bond between tape 66 and pad 60. After application of tape 66 in the field, installation personnel simply places pad 60 onto the roof and applies pressure by walking over the pads or with a roller.

Pad 60 is provided with at least one pad fastener 78 on top surface 62, which may be secured thereto with adhesives or the like. Pad fastener 78 may be a hook-type material in the form of a thin sheet having a plurality of hooks projecting therefrom. Pad fastener 78 may conversely be a loop-type material, in the form of a thin sheet having a plurality of loops projecting therefrom. As above, either hook-type or loop-type fasteners may be used so long as the opposed, mating fastener is of the opposite type. Thus, if panel fastener 16 is a loop-type fastener, the mating pad fastener 78 is a hook-type fastener, and vise versa.

Pad fastener 78 may be positioned on pad 60 in a variety of arrangements. For example, as shown in the present embodiment, pad fastener 78 may be in the form of four spaced parallel strips. In other embodiments less or more spaced strips might be employed. In still other embodiments, pad fastener 78 may be disposed on top surface 62 in a grid-like or crossed pattern. In still other embodiments, pad fastener 78 may cover substantially the entire top surface 62.

Figure 11:
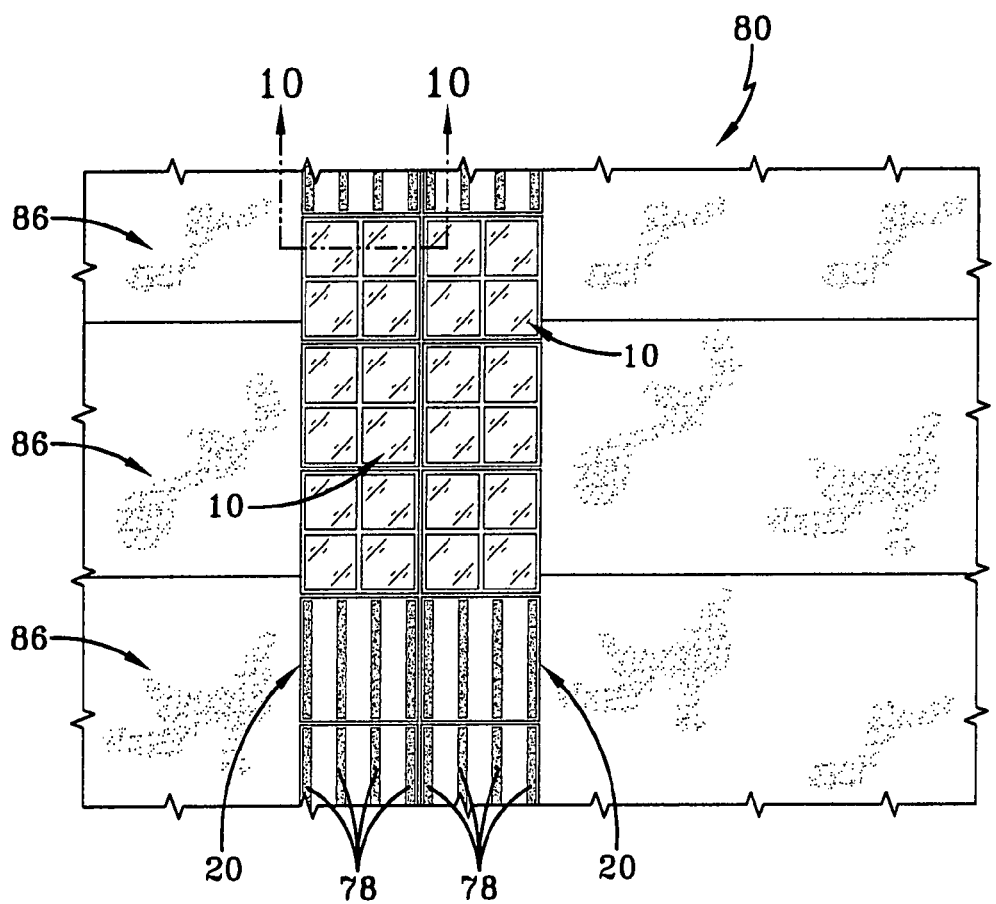
FIG. 11 is a section view of an alternate roof system.
Figure 12:
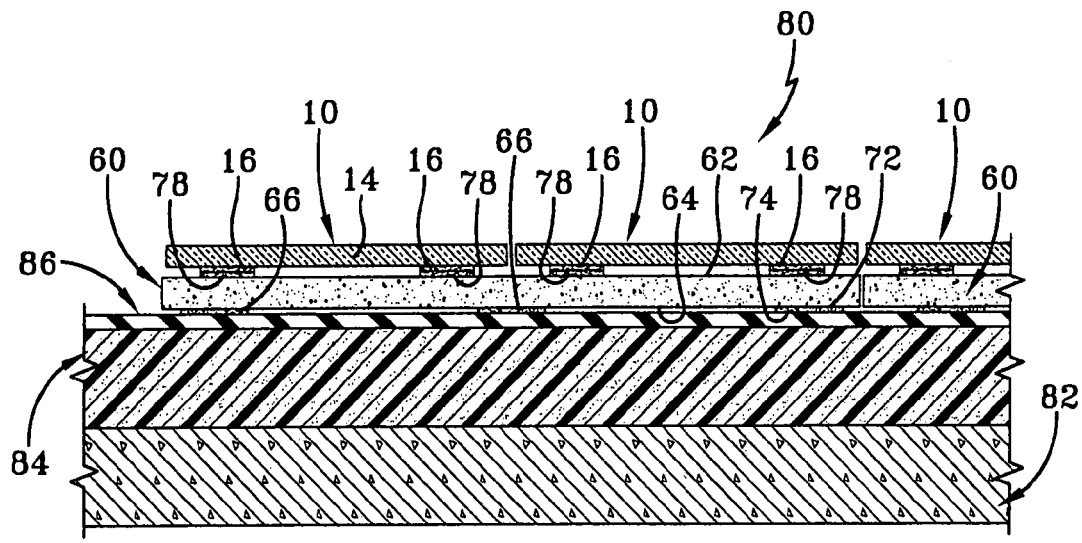
FIG. 12 is a top view of the roof system of FIG. 9.

Referring now to FIGS. 11 and 12, pad 60 is shown as used in conjunction with a roofing system 80. Roofing system 80 may include a roof structure 82 that is covered by an insulation layer 84. A membrane 86 is positioned above insulation layer 84 and secured thereto. Membrane 86 may be in the form of elongated sheets and may consist of, for example, bitumus materials, EPDM, TPO or the like. The sheets may be seamed to one another, and may include other structural features necessary for attaching the membrane 86 to the roof structure 82. Pads 60 may be positioned on top of membrane 86 in any desired arrangement or pattern. As is evident in FIG. 12, adhesive 66 couples to membrane 86 to hold pad 60 in place. In one embodiment, pads 60 may be placed in an abutting, contiguous row. In other embodiments, pads 60 may be positioned in a grid-like arrangement. In still other arrangements, pads 60 may be positioned to cover substantially an entire section of the roof surface.

Solar panels 10 are secured to pads 60 by bringing together the panel fasteners 16 of solar panels 10 with pad fasteners 78 of pads 60. Thereafter, solar panels 10 are mechanically coupled to pads 60 and consequently roof system 80. The mechanical coupling is capable of holding the solar panels against wind and other external forces, but is weak enough to allow the removal of solar panels 10 by a technician, if replacement or movement is required. Solar panels 10 may be disposed in a contiguous row. In other embodiments, solar panels 10 may be, disposed in a square or grid pattern on the roof surface. In still other embodiments solar panels 10 may completely cover a portion of, or substantially all of a roof surface. Solar panels 10 may be interconnected with a plurality of cables (not shown). The cables may or may not be releasable connections. The cables may extend to a junction box or other receiving station where the electric current may be conditioned and made available for use or stored in a battery system.

Figure 13:
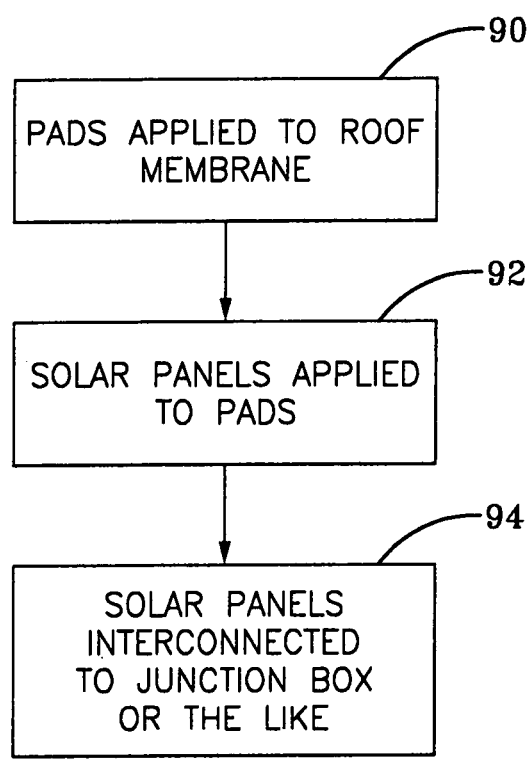
FIG. 13 is a flow chart exemplifying a method of installing solar panels according to the present invention.

Referring now to FIG. 13, an exemplary method of installation of the above disclosed pad/solar panel arrangement is shown. In a first step 90, pads 60 having pre-applied adhesive are transferred to the roof surface where release paper 76 is removed. Pad 60 may then be placed on membrane 86. Thereafter, pressure is applied, either by walking on the pad or with a roller or the like. One or more pads 60 are arranged according to desired solar panel placement.

In a second step 92, solar panels 10 are positioned on top of pads 60. Installation is accomplished by bringing together panel fasteners 16 of solar panels 10 with pad fasteners 78 of pads 60. In this manner, solar panels 10 are secured to the roof top though the mechanical coupling of the hook and loop fasteners.

Finally, in a third step 94, solar panels 10 are interconnected to a junction box or the like to receive electrical current and direct it to immediate use or send it to a battery mechanism for later use.

The embodiments herein are advantageous because solar panels 10 may easily and quickly be secured to a roof surface. Pads 60 may be easily arranged in any manner on the roof surface. Further, solar panels 10 may be easily removed or replaced because of the releasable nature of the hook and loop fastener arrangement. Further, solar cells become hot during peak daylight hours. This heat could damage underlying roof membranes or other structure. The provision of pads or pavers therebetween protects the underlying membrane from thermal damage. Still further, the hook and loop fasteners of the present invention must exhibit long term, high strength attachment properties. Thus, these high peel strength fasteners, if secured directly to a roof, may damage the roof during panel removal, due to the large force required to remove the panel. The pad or paver of the present invention prevents such damage during panel removal or replacement. Finally, it is known that roof membranes are susceptible to damage by human foot traffic or other activity on the roof surface. By providing fasteners on a pad or paver, separate from the more permanent roof system, not only is convenient coupling achieved, but the roof is protected during installation and servicing, resulting in longer roof life.

Various modifications and alterations that do not depart from the scope and spirit of this invention will become apparent to those skilled in the art. This invention is not to be duly limited to the illustrative embodiments set forth herein.

The invention claimed is:

1. An energy generating system for placement on a roofing membrane comprising:
   a plurality of pavers positioned on top of the roofing membrane, each said paver including an upper tongue extending from a first edge and a lower tongue extending from a second opposing edge, said upper and lower tongues configured to provide an interlocking engagement between adjacent pavers;
   at least one narrow strip paver fastener secured to each said paver;
   a plurality of photovoltaic devices, each said photovoltaic device including a top surface adapted to receive light, a bottom surface, and a frame positioned around the peripheral edge of the photovoltaic device and having at least one device fastener secured to a bottom surface of the frame so that said at least one device fastener is substantially disposed around a bottom peripheral edge of said photovoltaic device, each said photovoltaic device having a periphery shaped to match a periphery of a corresponding paver;
   wherein said at least one narrow strip paver fastener and said at least one device fastener are alternately of a hook or loop structure and are positioned adjacent to each other to secure said photovoltaic device to said paver so that the periphery of said photovoltaic device is substantially aligned with said attached paver.

2. The energy generating system of claim 1, where said at least one device fastener is secured to said bottom surface of said frame by an adhesive.

3. The energy generating system of claim 1, where said at least one narrow strip paver fastener is secured to said at least one paver by an adhesive.

4. The energy generating system of claim 1, where said at least one device fastener are narrow strips, and wherein said at least one narrow strip paver fastener is at least a pair of parallel strips to selectively intersect with said at least one narrow strip device fastener.

5. The energy generating system of claim 4 where said at least one paver and said photovoltaic device have multiple narrow strips of fastener secured thereto, and where said narrow strips are positioned parallel to one another.

6. A roofing system comprising:
   an insulation layer positioned over a roof deck;
   a roofing membrane secured over said insulation layer;
   a plurality of pavers positioned over and in contact with said roofing membrane, each said paver including an upper tongue extending from a first edge and a lower tongue extending from a second opposing edge, said upper and lower tongues configured to provide an interlocking engagement between adjacent pavers;
   at least one paver fastener secured to at least one of said pavers;
   a plurality of photovoltaic devices, each said photovoltaic device including a top surface adapted to receive light and a bottom surface; and
   at least one device fastener secured to said photovoltaic device adjacent said bottom surface so that said at least one device fastener is substantially disposed around a bottom peripheral edge of said photovoltaic device, each said photovoltaic device having a periphery shaped to match a periphery of a corresponding paver,
   wherein said at least one paver fastener and said at least one device fastener are alternately of a hook or loop structure and are positioned adjacent to each other to secure said photovoltaic device to said at least one paver so that the periphery of said photovoltaic device is substantially aligned with said attached paver.

7. The roofing system of claim 6, where a plurality of said pavers, but less than all of said pavers, include at least one paver fastener secured thereto, and where a photovoltaic device including at least one device fastener is positioned adjacent to and secured to each of said paver fasteners.

8. The roofing system of claim 6, where said at least one device fastener is secured to a bottom surface of a frame by an adhesive.

9. The energy generating system of claim 6, where said at least one paver fastener is secured to said at least one of said pavers by an adhesive.

10. The energy generating system of claim 6, where said at least one paver fastener and said at least one device fastener are narrow strips, wherein said at least one paver fastener is at least a pair of parallel strips to selectively intersect with said at least one device fastener.

11. The energy generating system of claim 10 where said at least one paver and said photovoltaic device have multiple narrow strips of fastener secured thereto, and where said narrow strips are positioned parallel to one another.

* * * * *